(12) United States Patent
Marcus (10) Patent No.: US 9,419,844 B2
(45) Date of Patent: Aug. 16, 2016

(54) METHOD AND SYSTEM FOR GENERATION OF MEDIA

(75) Inventor: Dwight Marcus, Ojai, CA (US)

(73) Assignee: NTECH PROPERTIES, INC., Oxnard, CA (US)

( * ) Notice: Subject to any disclaimer, the term of this patent is extended or adjusted under 35 U.S.C. 154(b) by 862 days.

(21) Appl. No.: 11/649,727

(22) Filed: Jan. 4, 2007

(65) Prior Publication Data

US 2007/0157275 A1 Jul. 5, 2007

Related U.S. Application Data

(63) Continuation-in-part of application No. 11/156,086, filed on Jun. 16, 2005, which is a continuation of application No. 09/953,086, filed on Sep. 11, 2001, now abandoned.

(60) Provisional application No. 60/756,357, filed on Jan. 4, 2006.

(51) Int. Cl.
*H04N 7/173* (2011.01)
*H04L 29/06* (2006.01)
*G06Q 30/02* (2012.01)
*H04N 21/234* (2011.01)
*H04N 21/8543* (2011.01)

(52) U.S. Cl.
CPC .......... *H04L 29/06027* (2013.01); *G06Q 30/02* (2013.01); *H04L 65/4084* (2013.01); *H04L 65/607* (2013.01); *H04N 21/23412* (2013.01); *H04N 21/8543* (2013.01)

(58) Field of Classification Search
USPC ........................ 725/32, 34–36, 42, 86–87, 91
See application file for complete search history.

(56) References Cited

U.S. PATENT DOCUMENTS

| 3,900,219 A | 8/1975 | D'Amato et al. |
| 3,926,325 A | 12/1975 | Benson |
| 4,290,141 A | 9/1981 | Anderson et al. |

(Continued)

FOREIGN PATENT DOCUMENTS

| EP | 564247 | 10/1993 |
| WO | WO 93/23836 | 11/1993 |

(Continued)

OTHER PUBLICATIONS

Curtis et al., "Multimedia Content Management-Provision of Validation and Personalisation Services", IEEE, pp. 302-306, Jun. 1999.

(Continued)

*Primary Examiner* — Yassin Alata
(74) *Attorney, Agent, or Firm* — Troutman Sanders LLP (57) ABSTRACT

A method of generating media programming includes providing a first media source having a plurality of media elements, tags associated with each of the media elements, and one or more first media source templates for assembling of the media elements into media programming. The method further includes providing a second media source, the second media source having at least a second template and receiving a request for media programming at the second media source. The method further includes in response to the request, generating media programming including selected ones of the media elements assembled in accordance with at least the second template.

7 Claims, 9 Drawing Sheets

(56) References Cited

U.S. PATENT DOCUMENTS

| | | | |
|---|---|---|---|
| D264,810 S | 6/1982 | Voltmann | |
| 4,377,870 A | 3/1983 | Anderson et al. | |
| 4,566,030 A | 1/1986 | Nickerson et al. | |
| 4,724,166 A | 2/1988 | deBruin | |
| 4,724,491 A | 2/1988 | Lambert | |
| 4,744,281 A | 5/1988 | Isozaki | |
| 4,850,618 A | 7/1989 | Halladay, Jr. | |
| 4,959,734 A | 9/1990 | Foster | |
| 5,029,014 A | 7/1991 | Lindstrom | |
| 5,034,807 A | 7/1991 | Von Kohorn | |
| 5,041,972 A | 8/1991 | Frost | |
| 5,046,004 A | 9/1991 | Tsumura et al. | |
| 5,083,491 A | 1/1992 | Fields | |
| 5,109,482 A | 4/1992 | Bohrman | |
| 5,132,992 A | 7/1992 | Yurt et al. | |
| 5,142,961 A | 9/1992 | Paroutaud | |
| 5,153,829 A | 10/1992 | Furuya et al. | |
| 5,206,929 A | 4/1993 | Langford et al. | |
| 5,208,421 A | 5/1993 | Lisle et al. | |
| 5,227,863 A | 7/1993 | Bilbrey et al. | |
| 5,236,200 A | 8/1993 | McGregor et al. | |
| 5,247,126 A | 9/1993 | Okamura et al. | |
| 5,253,275 A | 10/1993 | Yurt et al. | |
| 5,262,940 A | 11/1993 | Sussman | |
| 5,303,042 A | 4/1994 | Lewis et al. | |
| 5,307,456 A | 4/1994 | MacKay | |
| 5,317,732 A | 5/1994 | Gerlach et al. | |
| 5,353,391 A | 10/1994 | Cohen et al. | |
| 5,388,197 A | 2/1995 | Rayner | |
| 5,388,264 A | 2/1995 | Tobias et al. | |
| 5,390,138 A | 2/1995 | Milne et al. | |
| 5,393,926 A | 2/1995 | Johnson | |
| 5,414,808 A | 5/1995 | Williams | |
| 5,428,774 A | 6/1995 | Takahashi et al. | |
| 5,434,678 A | 7/1995 | Abecassis | |
| 5,440,730 A | 8/1995 | Elmasri et al. | |
| 5,483,276 A | 1/1996 | Brooks et al. | |
| 5,486,645 A | 1/1996 | Suh et al. | |
| 5,515,490 A | 5/1996 | Buchanan et al. | |
| 5,519,828 A | 5/1996 | Rayner | |
| 5,543,925 A | 8/1996 | Timmermans | |
| 5,550,863 A | 8/1996 | Yurt et al. | |
| 5,550,965 A | 8/1996 | Gabbe et al. | |
| 5,553,221 A | 9/1996 | Reimer et al. | |
| 5,559,548 A | 9/1996 | Davis et al. | |
| 5,561,711 A | 10/1996 | Muller | |
| 5,576,844 A | 11/1996 | Anderson et al. | |
| 5,580,054 A | 12/1996 | Shneifer | |
| 5,616,876 A | 4/1997 | Cluts | |
| 5,633,726 A | 5/1997 | Timmermans | |
| 5,634,020 A | 5/1997 | Norton | |
| 5,644,686 A | 7/1997 | Hekmatpour | |
| 5,659,539 A | 8/1997 | Porter et al. | |
| 5,659,793 A | 8/1997 | Escobar et al. | |
| 5,680,639 A | 10/1997 | Milne et al. | |
| 5,687,331 A | 11/1997 | Volk et al. | |
| 5,689,641 A | 11/1997 | Ludwig et al. | |
| 5,713,021 A | 1/1998 | Kondo et al. | |
| 5,721,815 A | 2/1998 | Ottesen et al. | |
| 5,721,878 A | 2/1998 | Ottesen et al. | |
| 5,729,471 A | 3/1998 | Jain et al. | |
| 5,748,187 A | 5/1998 | Kim et al. | |
| 5,748,956 A | 5/1998 | Lafer et al. | |
| 5,751,883 A | 5/1998 | Ottesen et al. | |
| 5,752,029 A | 5/1998 | Wissner | |
| 5,754,851 A | 5/1998 | Wissner | |
| 5,765,164 A | 6/1998 | Prasad et al. | |
| 5,781,730 A | 7/1998 | Reimer et al. | |
| 5,799,150 A | 8/1998 | Hamilton et al. | |
| 5,799,282 A | 8/1998 | Rakshit et al. | |
| 5,819,286 A | 10/1998 | Yang et al. | |
| 5,826,102 A | 10/1998 | Escobar et al. | |
| 5,852,435 A | 12/1998 | Vigneaux et al. | |
| 5,861,880 A | 1/1999 | Shimizu et al. | |
| 5,864,682 A | 1/1999 | Porter et al. | |
| 5,864,868 A | 1/1999 | Contois | |
| 5,870,030 A | 2/1999 | DeLuca et al. | |
| 5,875,305 A | 2/1999 | Winter et al. | |
| 5,949,951 A | 9/1999 | Sklar et al. | |
| 5,966,121 A | 10/1999 | Hubbell et al. | |
| 5,999,909 A | 12/1999 | Rakshit et al. | |
| 6,002,720 A | 12/1999 | Yurt et al. | |
| 6,032,156 A | 2/2000 | Marcus | |
| 6,144,702 A | 11/2000 | Yurt et al. | |
| 6,154,771 A | 11/2000 | Rangan et al. | |
| 6,293,868 B1 | 9/2001 | Bernard | |
| 6,314,451 B1 | 11/2001 | Landsman et al. | |
| 6,317,761 B1 | 11/2001 | Landsman et al. | |
| 6,317,784 B1 | 11/2001 | Mackintosh et al. | |
| 6,320,495 B1 | 11/2001 | Sporgis | |
| 6,379,251 B1 | 4/2002 | Auxier et al. | |
| 6,456,981 B1 | 9/2002 | Dejaeger et al. | |
| 6,760,916 B2 * | 7/2004 | Holtz et al. | 725/34 |
| 6,764,395 B1 | 7/2004 | Guyett | |
| 6,813,775 B1 | 11/2004 | Finseth et al. | |
| 6,883,000 B1 | 4/2005 | Gropper | |
| 7,024,677 B1 * | 4/2006 | Snyder et al. | 725/86 |
| 7,130,831 B2 * | 10/2006 | Howard et al. | 705/57 |
| 7,380,262 B2 * | 5/2008 | Wang et al. | 725/46 |
| 7,603,684 B1 * | 10/2009 | Ellis | 725/39 |
| 7,617,190 B2 | 11/2009 | Wright et al. | |
| 7,877,676 B2 | 1/2011 | Munetsugu et al. | |
| 7,937,582 B1 | 5/2011 | Lee | |
| 8,386,588 B1 | 2/2013 | Cooley | |
| 2001/0056577 A1 | 12/2001 | Gordon et al. | |
| 2002/0019858 A1 | 2/2002 | Kaiser et al. | |
| 2002/0077902 A1 | 6/2002 | Marcus | |
| 2002/0087976 A1 * | 7/2002 | Kaplan et al. | 725/34 |
| 2002/0092019 A1 | 7/2002 | Marcus | |
| 2002/0111912 A1 | 8/2002 | Hunter et al. | |
| 2002/0170068 A1 * | 11/2002 | Rafey et al. | 725/112 |
| 2002/0188949 A1 * | 12/2002 | Wang et al. | 725/46 |
| 2003/0163815 A1 | 8/2003 | Begeja et al. | |
| 2003/0167202 A1 | 9/2003 | Marks et al. | |
| 2004/0025180 A1 | 2/2004 | Begeja et al. | |
| 2005/0165626 A1 | 7/2005 | Karpf | |
| 2005/0198677 A1 | 9/2005 | Lewis | |
| 2005/0240456 A1 | 10/2005 | Ward et al. | |
| 2005/0262151 A1 | 11/2005 | Plastina et al. | |
| 2006/0031551 A1 | 2/2006 | Agresta et al. | |
| 2006/0167860 A1 | 7/2006 | Eliashberg et al. | |
| 2006/0184982 A1 | 8/2006 | Paz et al. | |
| 2007/0113250 A1 | 5/2007 | Logan et al. | |
| 2007/0157275 A1 | 7/2007 | Marcus | |
| 2007/0180523 A1 | 8/2007 | Jablonski et al. | |
| 2007/0192401 A1 | 8/2007 | Weakliem et al. | |
| 2008/0010337 A1 | 1/2008 | Hayes et al. | |
| 2008/0092168 A1 | 4/2008 | Logan et al. | |
| 2008/0140674 A1 | 6/2008 | Ishikawa | |
| 2010/0049699 A1 | 2/2010 | Benschoter et al. | |
| 2012/0180083 A1 | 7/2012 | Marcus | |

FOREIGN PATENT DOCUMENTS

| | | |
|---|---|---|
| WO | WO 96/08108 | 3/1996 |
| WO | WO 96/19779 | 6/1996 |
| WO | WO 97/04596 | 2/1997 |
| WO | WO 97/17111 | 5/1997 |

OTHER PUBLICATIONS

Paek et al., Self-Describing Schemes for Interoperable MPGE-7 Multimedia Content Descriptions, CiteSeer, Department of Electrical Engineering, Columbia University, pp. 1-18, Jan. 1999.

Li et al., "Multimedia Content Description in the Infopyramid", IEEE, pp. 3789-3792, 1998.

Kirda, Engin et al., "MYXML: An XML based template engine for the generation of flexible web content" [online]. In Proceedings of 2000 (pp. 317-322). Chesapeake, VA: AACE [retrieved on Sep. 8, 2007]. Retrieved from the Internet: <URL: http://media.inhatc.ac.kr/papers/hypermedia/Kirda00.pdf>.

Curtis et al., "Multimedia Content Management-Provision of Validation and Personalisation Services", IEEE, 1999, pp. 302-306.

(56) References Cited

OTHER PUBLICATIONS

International search report dated Feb. 25, 2008 for related application PCT/US 07/00207.

Kirda, Engin et al., "MYXML: An XML based template engine for the generation of flexible web content" [online]. In Proceedings of 2000 (pp. 317-322). Chesapeake, VA: AACE [retrieved on Sep. 8, 2007]. Retrieved from the Internet: <URL: http://media.inhatc.ac.kr/papers/hypermedia/KirdaOO.pdf>.

Lee, Taekyong, "Query Processing Technique for Multimedia Presentation Graphs", Eighth International Workshop on Research Issues in Fata Engineering, Continuous Media Databases and Applications. 1998, pp. 130-138.

Li, Chung-Sheng et al., "Multimedia Content Description in the Infopyramid", Proceedings of the 1998 IEEE International Conference on Acoustics, Speech and Signal Processing, 1998, vol. 6, pp. 3789-3792.

Owner's Manual, Sony Video Cassette Recorder Model SLV-662HF, 1999.

Paek et al., "Self-Describing Schemes for Interoperable MPGE-7 Multimedia Content Descriptions", CiteSeer, Department of Electrical Engineering, Columbia University, 1999, pp. 1-18.

Piamsa-Nga, Punpiti, "A Parallel Model for Multimedia Database on Cluster System Environment", Proceedings IEEE International Symposium on Industrial Electronics, ISIE, 1998, vol. 2, pp. 648-652.

Saraceno, C., "Video Content Extraction and Representation Using a Joint Audio and Video Processing", Proceedings of the 1999 IEEE International Conference on Acoustics, Speech and Signal Processing, vol. 6, Date: Mar. 15-19, 1999, pp. 3033-3036.

Smith, John R. et al., "Visually Searching the Web for Content", IEEE, 1997. pp. 12-20.

Wu, Chao-Hui, "Querying Multimedia Presentations", Proceedings IEEE Conference on Protocols for Multimedia Systems-Multimedia Networking, 1997, pp. 64-73.

\* cited by examiner

METHOD AND SYSTEM FOR GENERATION OF MEDIA

RELATED APPLICATIONS

This application claims the benefit of U.S. Provisional Patent Application Ser. No. 60/756,357, filed Jan. 4, 2006, which application is incorporated by reference in its entirety herein. This application is also a continuation-in-part of U.S. patent application Ser. No. 11/156,086, filed Jun. 16, 2005, which is a continuation in part of U.S. patent application Ser. No. 09/953,086, filed Sep. 11, 2001 now abandoned, which applications are incorporated by reference in their entireties herein.

FIELD OF THE INVENTION

The present invention relates to generation of media programming.

BACKGROUND OF THE INVENTION

Methods and systems for generation of media programming have been disclosed in my U.S. Pat. No. 6,032,156, which is hereby incorporated by reference herein in its entirety. In some embodiments, a library of media elements, which may include brief video clips, brief audio recordings, and other types of media, may be maintained. The media elements are tagged, and a database maintains the tags. Various parameters and instructions for assembly of media elements into programming may be provided, such as through templates, and the media elements are assembled into media programming.

SUMMARY OF THE INVENTION

In an embodiment, a method of generating media programming includes providing a first media source having a plurality of media elements, tags associated with each of the media elements, and one or more first media source templates for assembling of the media elements into media programming. The method further includes providing a second media source, the second media source having at least a second template and receiving a request for media programming at the second media source. The method further includes in response to the request, generating media programming comprising selected ones of the media elements assembled in accordance with at least the second template.

In another embodiment, a method of providing media programming includes receiving a request for media programming; providing to a first media source a request for generation of media programming, the first media source having media elements, tags associated with each of the media elements, and one or more first media source templates for assembling of the media elements into media programming, the programming to be assembled in accordance with at least a second template from the second media source; receiving generated media programming from the first source; and providing the generated media programming responsive to the request.

In another embodiment, a system for generating media programming includes a first media source having media elements, tags associated with each of the media elements, and one or more first media source templates for assembling of the media elements into media programming; and a second media source having at least a second template. At least one of the first and second media sources is adapted to generate, in response to a request for media programming received at the second source, media programming including selected ones of the media elements assembled in accordance with at least the second template.

In another embodiment, a method for generating media programming includes providing a media source having media elements, tags associated with each of the media elements, and one or more first templates for assembling of the media elements into media programming; receiving a request for media programming; responsive to the request, generating media programming including ones of the media elements assembled in accordance with at least one of the templates; providing the media programming and an identifier associated with the media programming in response to the request; receiving the identifier in a second request; and providing the media programming in response to the second request.

In another embodiment, a system for generating media programming includes a media source having media elements, tags associated with each of the media elements, and one or more first templates for assembling of the media elements into media programming. The media source being adapted to receive a request for media programming and, responsive to the request, generate media programming including ones of the media elements assembled in accordance with at least one of the templates. The system has a processor for providing the media programming and an identifier associated with the media programming in response to the request; receiving the identifier in a second request; and providing the media programming in response to the second request.

In another embodiment, a method of facilitating navigating a system having media elements and adapted to assemble the media elements into media programming includes providing for a user at least a first media program assembled from the media elements in accordance with a first level; presenting to a user a menu option to select a second level; receiving from the user a selection of the second level; and providing for the user a first tier experience including a series of media programs of relatively brief duration assembled from ones of the media elements consistent with the selected option.

In another embodiment, a system for facilitating navigating a system having media elements and adapted to assemble the media elements into media programming includes a processor, operating in accordance with instructions in computer program code, for providing for a user at least a first media program assembled from the media elements in accordance with a first level; a processor, operating in accordance with instructions in computer program code, for presenting to a user a menu option to select a second level; and a processor, operating in accordance with instructions in computer program code for, in response to receiving from the user a selection of the second level, providing for the user a first tier experience including a series of media programs of relatively brief duration assembled from ones of the media elements consistent with the selected option.

In another embodiment, a method of tagging each of multiple media elements includes assigning a value to each of the media elements on a first scale; and assigning a value to each of the media elements in a second scale.

In another embodiment, a method of generating media programming includes assigning a value to media elements on at least one scale, wherein the media elements make up pre-existing programming; receiving a rule related to a value on the scale; and in response to receiving the rule, generating a version of the pre-existing programming having media elements that violate the rule deleted, a temporal order of the media elements being preserved.

In another embodiment, a computer-readable medium having stored thereon a plurality of instructions, the plurality of instructions including instructions for performing the steps of receiving an assignment of a value to a plurality of media elements on at least one scale, wherein the media elements make up pre-existing programming; receiving a rule related to a value on the scale; and in response to receiving the rule, generating a version of the pre-existing programming having media elements that violate the rule deleted, a temporal order of the media elements being preserved.

In another embodiment, a method of providing media programming from media elements, parameters being associated with each of the media elements, includes providing a user prompt related to one or more parameters associated with media elements included in a first media program assembled from a library of media elements; receiving from a user a parameter selection signal; and providing a second media program assembled from the library of media elements in response to the received parameter selection signal.

In another embodiment, a computer-readable medium has stored thereon instructions, including instructions for causing a processor to provide a user prompt related to one or more parameters associated with media elements included in a first media program assembled from a library of media elements; receiving from a user a parameter selection signal; and causing the processor to provide a second media program assembled from the library of media elements in response to the received parameter selection signal.

In another embodiment, a method of generating media programming includes providing a first media source having a plurality of first media elements, tags associated with each of the first media elements, and one or more first media source templates for assembling of the first media elements into media programming; receiving at least one second media element from a second media source, the second media element having at least one rule for use associated therewith; and generating media programming including at least some of the first media elements and the second media element, in accordance with at least one of the templates and the rule.

In another embodiment, a system for generating media programming includes a first media source having first media elements, tags associated with each of the first media elements, and one or more first media source templates for assembling of the first media elements into media programming. The first media source is adapted to receive at least one second media element from a second media source, the second media element having at least one rule for use associated therewith; and to generate media programming including at least some of the first media elements and the second media element, in accordance with at least one of the templates and the rule.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is in no way intended to limit the invention, its application, or uses.

Figure 1:
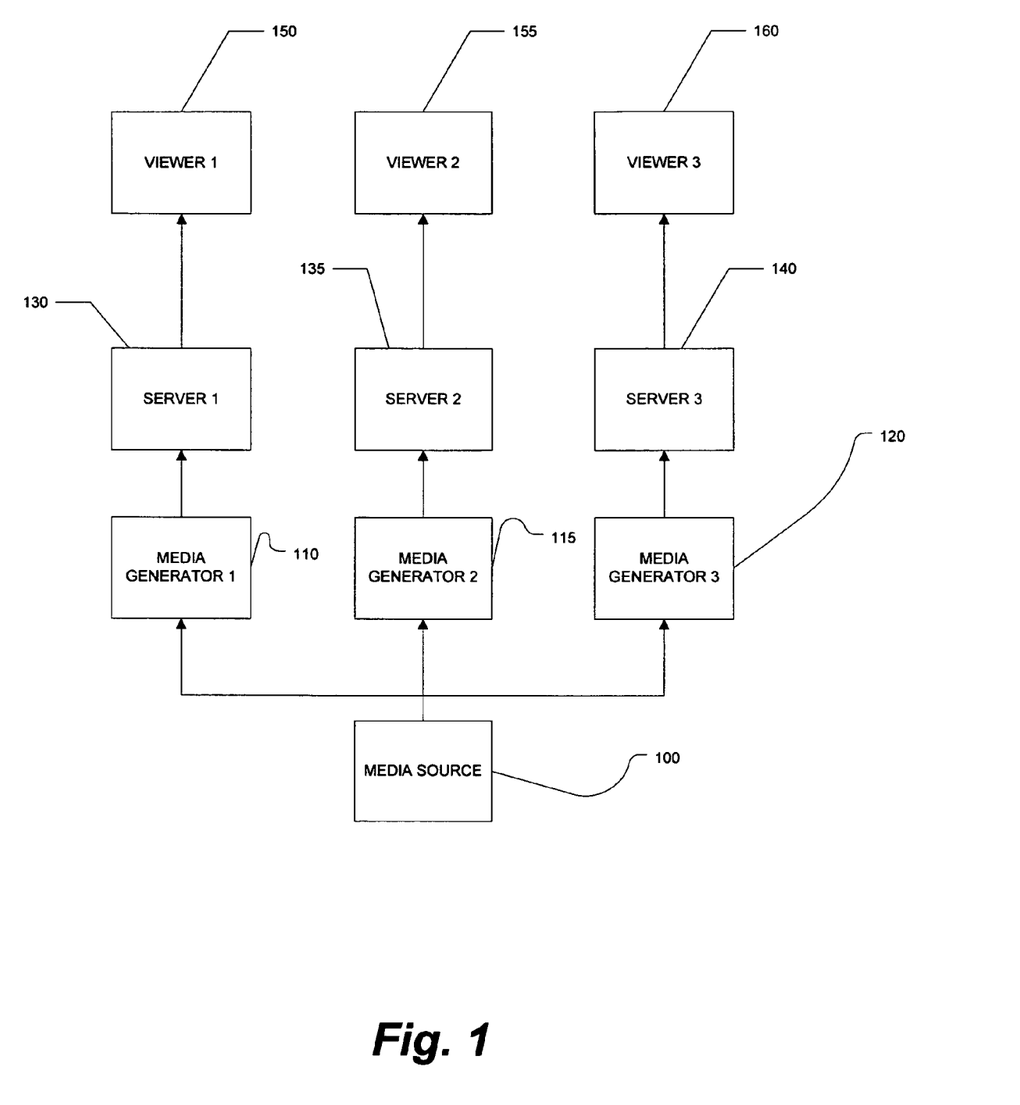
FIG. 1 shows a schematic diagram of a system according to an embodiment.

Referring now to FIG. 1, a system for generation of media programming will be described. A media source 100 is shown. Media source 100 may include a database containing tags including information regarding a plurality of media elements. Media source 100 may also include stored media elements. Media source 100 may further include one or more templates for assembling of media elements into programming.

Media elements may include any media information that may be viewed, heard, or otherwise experienced by a user, or that affects any media that may be viewed, heard or otherwise experienced by a user. By way of example, media elements may include periods of prerecorded video, prerecorded audio, prerecorded audio and video, and instructions related to generation of audio and video.

Tags may include any information characterizing any media element. Such tags may include a summary of content, type of media, information regarding lighting, effects, music, sound quality, scenes, and any other type of information related to the media element. Tags may be maintained in a separate database from media elements, or may be in the form of meta data or other data associated with media elements.

Templates include information and instructions for assembling media elements. The media elements do not have an inherent temporal order.

At least one media generator, in addition to media source 100, is provided. In the embodiment of FIG. 1, three media generators 110, 115, 120 are illustrated. Each media generator 110, 115, 120 may include templates or other instructions or sets of instructions for generating media programming. The instructions for generating media programming may include instructions for selection of media elements by any suitable parameter to generate media programming. By way of example, the instructions may limit the generated media programming by topic. By way of alternative example, the instructions may include insertion of specific media elements in any media programming, or require the insertion of media elements having a particular tag. The specific media elements to be inserted may include a reference to the name or identity of an owner or operator of a media generator, for example.

In one embodiment, the media generator 110, 115, 120 may provide instructions, in the form of tags and templates, to media source 100. In accordance with the received instructions, media source 100 may provide programming, such as in the form of a suitably interpolated audio, video, or audiovisual program, to media generator 110 or to server 130, for serving to user 150. Thus, in response to a request received from a user 150, which may be generated by, for example, a web client running on a personal computer, personal digital assistant, cellular telephone, digital cable, satellite or Internet television, satellite radio, satellite telephone, or other device, media generator 110 develops a set of instructions, and provides those instructions to media source 100. In response to the set of instructions, media source 100 assembles and delivers programming to media generator 110. Media generator provides those to server 130, which then returns the programming to the user 150. Of course, it will be appreciated that the programming may be delivered directly to user 150, such as through a separate browser window.

In another embodiment, media generators 110, 115, 120 maintain locally a database identifying media elements. In this embodiment, media generator determines, based on a set of instructions, the media elements and their order. The media elements and their order are then delivered to media source 100, which returns media programming as above. In yet another embodiment, media generators 110, 115, 120 each include both a database of tags and other information relating to media elements, and recorded media elements as well. The recorded media elements may be copied periodically from the recorded media elements maintained by media source 100, or may be a subset of those stored recorded media elements. Additional media elements not maintained at media source 100 may also be provided.

In some embodiments, each of servers 130, 135, 140 may be operated by entities distinct from an owner or operator of the media source 100. Examples of owners or operators may include providers of entertainments, such as musical groups, including bands and orchestras, film studios, music producers, theatrical groups; retailers of goods and services; educational institutions; other non-profits, and other entities. By way of example, server 130 may provide a website of a musical artist. When user 150 presents a request to server 130, server 130 issues a request to media generator 110 to provide media programming. Media programming is returned, in one of the implementations discussed above, including, for example, a selection of clips of the band playing. The programming may also include interviews with one or more band members, music videos, videos taken backstage at concert venues, and other content that is tagged as being of interest. Videos and other media contributed by other users, such as fans of a band, may be incorporated into the library of media elements.

In another example, server 140 provides a website of a retailer. The media returned may include programming including media elements featuring activities related specifically to products sold by the retailer, and/or to a general impression that the retailer wishes to provide. For example, a retailer of hiking, camping and other outdoor gear may provide nature and adventure media programming. A retailer of housewares may provide media programming featuring home design, or entertaining at home, by way of example.

In the above embodiments, consideration may be paid to an entity that owns or operates media source 100 by an entity that owns or operates one or more of servers 130, 135, 140.

The generation of the media programming may be transparent to the user, so that the user is aware only of the server 130, 135 or 140, and is not aware of the first media source 100. By way of example, media programming may include various devices for branding with the identity of server 130, 135, 140, or the respective owner or operator. Such devices for branding may include incorporating a logo in an image display, periodically or at logical breaks in programming inserting audio or video identities of the owner or operator, or other techniques.

In some embodiments, if a user, such as any of users 150, 155, 160 has exhausted all of the media that is specific to the owner or operator of server 130, 135, 140, such as all the media elements relating to a band, then a request may result in the generation of media programming from media source 100. Such generated media programming may be presented in such a manner that the user is not aware that the source is media source 100.

In another embodiment, media elements available through individual servers 130, 135, 140, may be made available to other servers.

Figure 2:
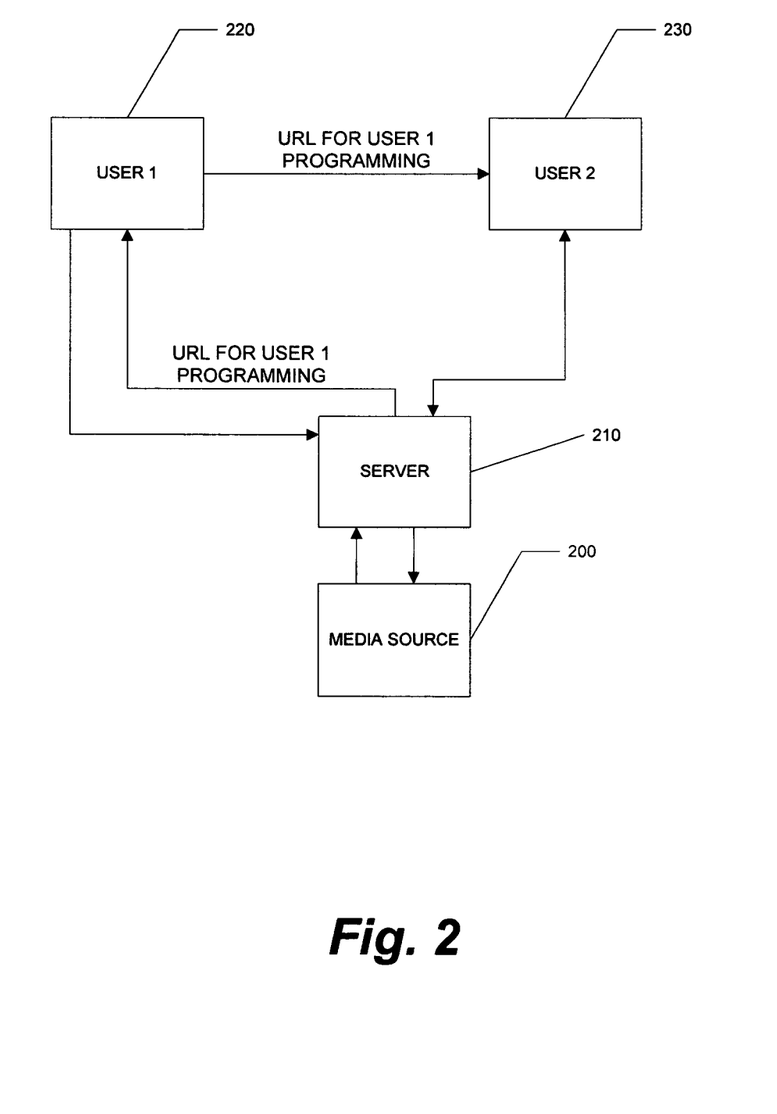
FIG. 2 is a schematic diagram of a system according to an alternative embodiment.

In an embodiment, explained with reference to FIG. 2, a user may make available predetermined programming, or modified programming, to another. First user 220 issues a request for programming to server 210, via a communications protocol such as TCP/IP via the Internet or other network. Server 210 requests programming from media source 200, which assembles media programming from tagged stored media segments in accordance with one or more templates or other preferences and instructions, and returns the media programming to server 210. Server 210 provides the programming, along with an identifier associated with the programming. The identifier may be a URL, by way of example. Server 210 is responsive to a request including the identifier to furnish the same provided programming. By way of example, the composition of the programming may be stored either at server 210 or media source 200. User 220 may then provide the identifier, such as a URL, to a second user 230, who then receives the programming by providing the same identifier to server 210.

User 220 may provide the identifier to one or more second users 230 in any suitable manner. For example, the user 220 may include the identifier in an e-mail. The user may cause the identifier to be posted as a URL on a web page or other resource capable of being accessed through a network. In some embodiments, the identifier may be in the form of a permalink. Advantageously, a user may share generated programming with others.

Figure 3:
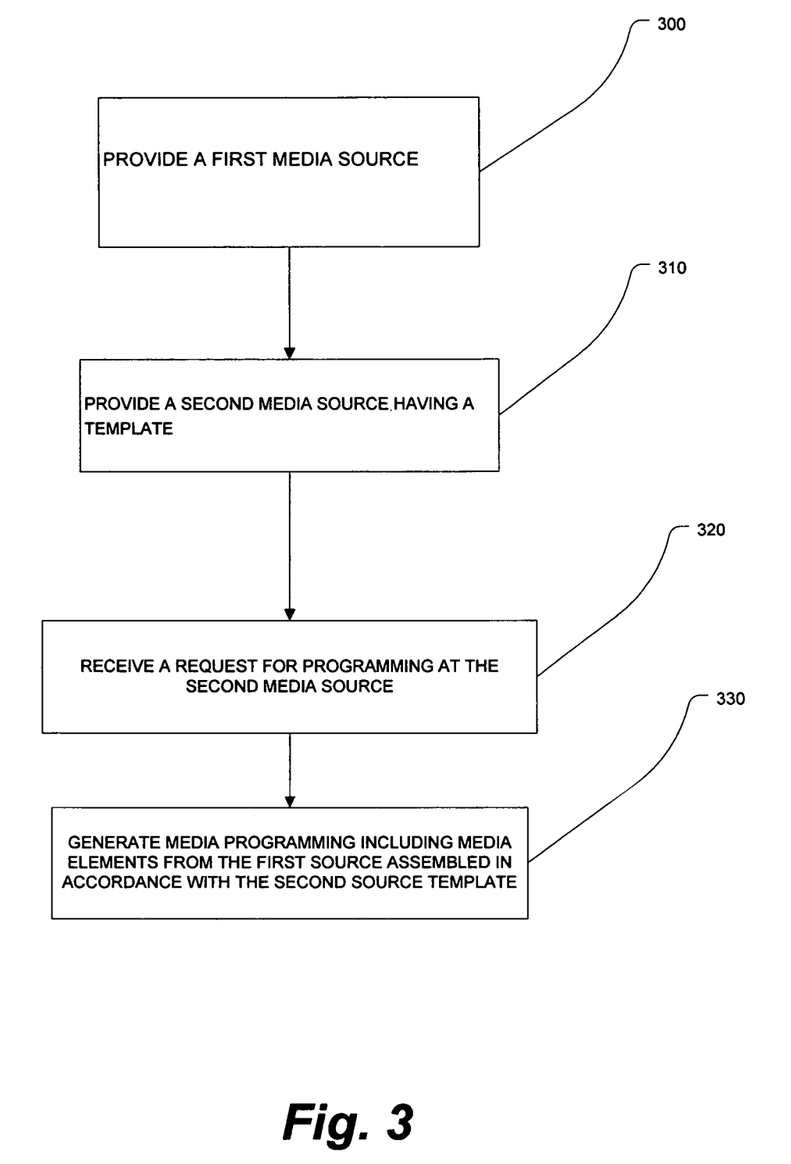
FIG. 3 is a process flow diagram of a process according to an embodiment.

Referring to FIG. 3, a method will now be described. A first media source, such as source 100, is provided, as indicated by block 300. A second media source, such as source 110, is provided, and has at least a template, as indicated by block 310. A request for programming is received by the second media source, as indicated by block 320. In response to the request, media programming is generated, including media elements from the first media source, and assembly in accordance at least with the template from the second media source, as indicated by block 330.

Figure 4:
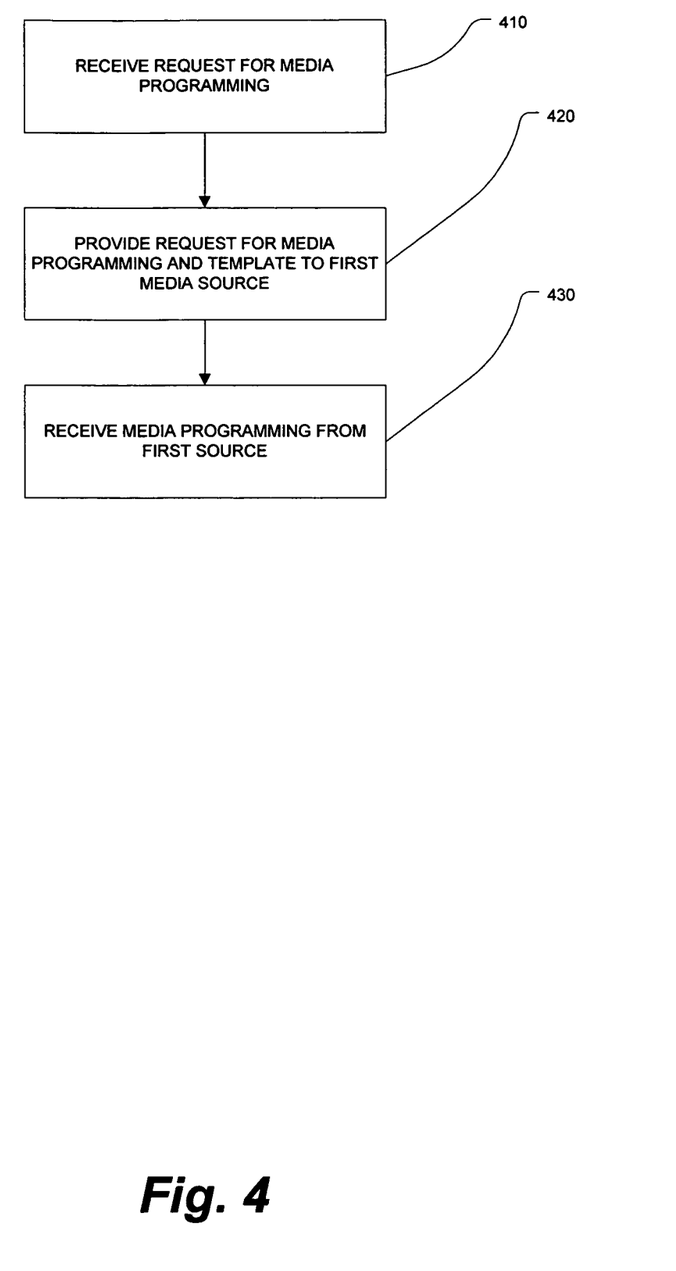
FIG. 4 is a process flow diagram of a process according to an alternative embodiment.

Referring now to FIG. 4, a method performed by a media source, such as media source 110, will now be described. A request is received, as indicated by block 410. A request for media programming, along with at least a template, is provided to media source 100, as indicated by block 420. Media programming is then received from first media source 100, as indicated by block 430. The media programming may then be provided responsive to the request.

Figure 5:
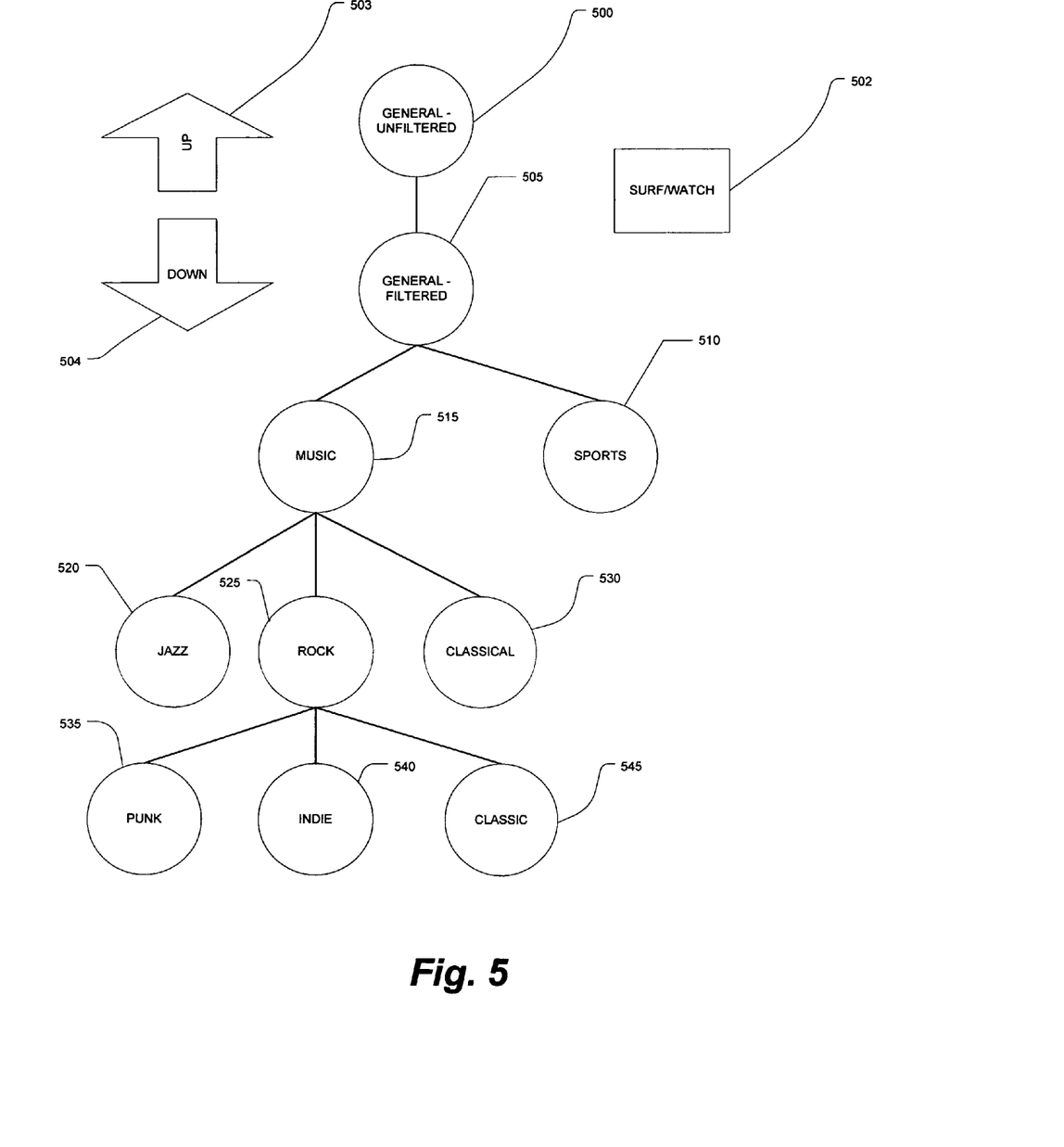
FIG. 5 illustrates a method and system for navigation in an embodiment.

Referring now to FIG. 5, a system of navigation will be explained. Media programming may be represented in a hierarchical manner, depending on the level of filtration of programming. The level of filtration may be navigated by a user command. In some embodiments, the command may be a simple up or down command. In other embodiments, the command may provide additional user choices. For example, at a highest level, indicated by block 500 of FIG. 5, the user is presented with general media programming with no filtration. A system may present the viewer with two tiers of viewing at any of the levels described herein. In a first tier, the viewer is presented with relatively brief presentations of programming. The duration of the relatively brief presentations may be selected to be sufficient to permit a viewer to make a decision as to whether to view longer programming similar to the presented brief presentation. By way of example, the duration of the relatively brief presentations may be from about one second or less to ten seconds or greater; the duration may be adjusted by the user. In a second tier, the viewer reviews a relatively long duration of programming, which may be anywhere from about one minute to several hours in duration. The user may continuously be presented with a selection between a first tier and a second tier. By way of example, the first tier may be named "surf" and the second tire "watch." The command to switch between first and second tiers may be a surf/watch toggle, as indicated by block 502. By selecting a level, in either the first or second tier, the user may be brought to a first tier at a different level. By way of example, a user starting at block 500, the general—no filter level, may be presented with options of greater detail. A display similar to FIG. 5 may be presented to the user as an aid in navigation. The user may navigate from block 500 to a filtered level, indicated at block 505. The filtered level, in the first tier, may present programming filtered by user preferences and demographic information, for example. The user at the second level may be provided a range of subject matter areas, such as music, indicated by block 515, sports indicated by block 510, and other categories, such as drama, nature, comedy, science, politics, and other subject matter categories. In response to the selection of one of these categories, the user may be presented with the first tier of that level, which may be filtered in accordance with user preferences. The user may then select a type of music from a menu, such as at blocks 520, 525, 530. The types of rock, such as punk 535, indie rock 540 or class rock 545.

In a further embodiment, the user may be presented with an option to select greater or lesser filtering. If the user selects greater filtering, then a more narrow range of programming, based on a more narrow range of media elements, is provided, based on information retained regarding the user. For example, if the user regularly selects indie rock from the choices shown in FIG. 5, a selection of greater filtering from the rock genre may result in the programming being limited to indie rock.

Alternatively, the particular filtering may not be known to the user. For example, the selection of greater filtering may result in the limiting of media programming by a factor such as geography.

If the user selects less filtering, i.e., a high level in the hierarchy, and then selects a greater level of filtering, the user may not return to the same selection logic. For example, the selection of less filtering, by pressing on an UP button, for example at 502, may result in a loss of genre selection, so that a user moves from Rock to Music. A selection of greater filtering, by pressing on a DOWN button 503, for example, may result in time period filtering, so that the user, rather than returning to music made up of elements tagged as Rock, receives programming tagged as music from the 1980's of all types.

It will be appreciated that the numbers of levels may be unlimited, depending on the granularity of the definition of the scope of the tags that will be included in the generated programming.

The user may be presented with an option of selecting parameters to be employed or discarded. For example, the user may be presented with a menu of options, such as genre, time period, types of instruments, nationality of performers, and other parameters. The user may select or deselect such parameters before selecting an UP or DOWN arrow. Based on the stored preferences associated with the user, the parameters for generation of media will then be altered. The user does not need to select the particular parameter. For example, if the user selects type of instrument and then the DOWN arrow, and the system has a stored preference of the user for brass instruments, then media elements including brass instruments will be selected.

Figure 6:
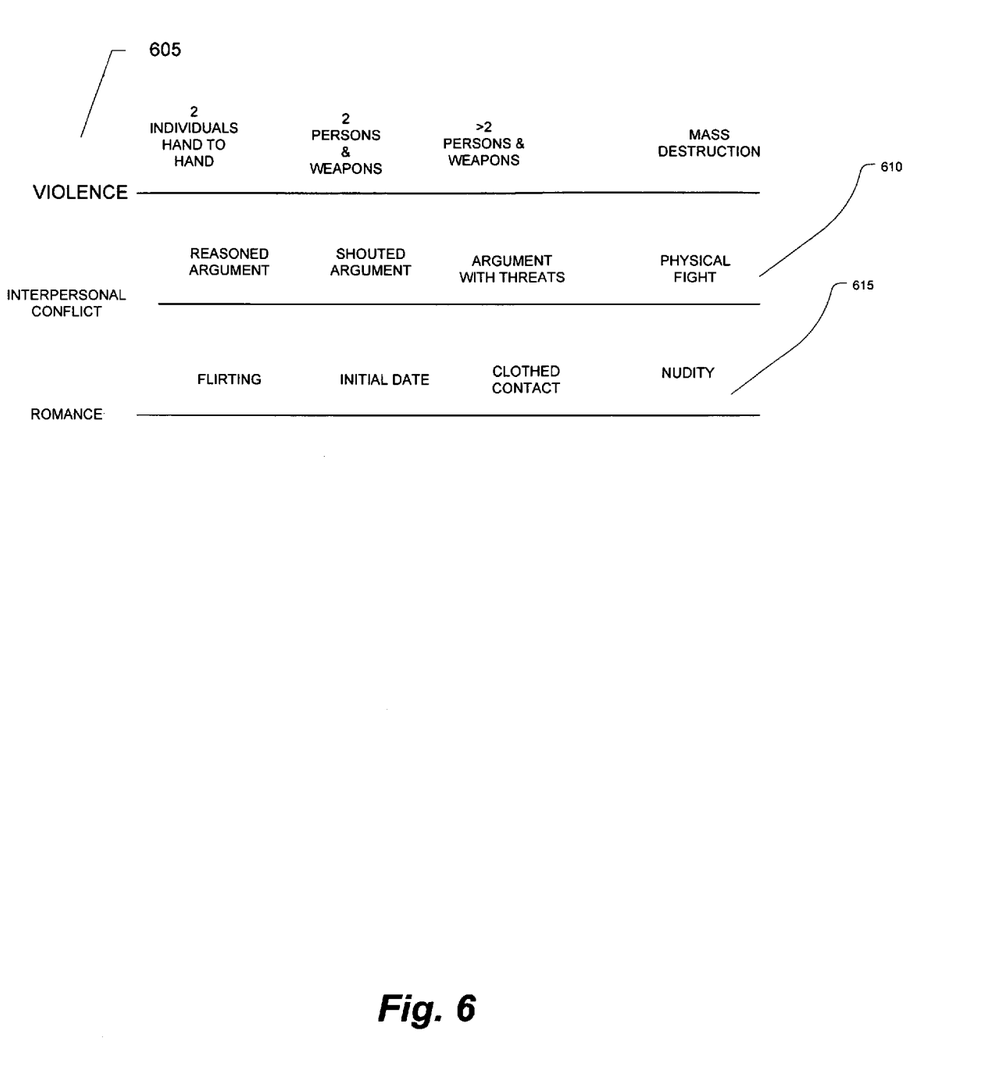
FIG. 6 illustrates exemplary scales for tagging of media elements in an embodiment.

In another embodiment, and referring now to FIG. 6, a method of making media elements available for multiple purposes will be explained. A media element may be assigned a value on a plurality of scales or axes. The scales or axes may be binary, for those either including or excluding a specific element. Even after a media element has been tagged, the element may be associated with additional tags or information in accordance with additional scales or axes. By way of example, referring to FIG. 6, each scene within a pre-existing film may be tagged on a number of scales. The scales shown in FIG. 6 are merely exemplary, and others may be contemplated. Scale 605 is a scale of violence, and includes exemplary data points, which vary from two individuals engaged in unarmed combat to mass mayhem. Scale 610 is a scale of interpersonal conflict with a different range. Scale 615 is a scale pertinent to romance.

The assigned values may be obtained in any suitable manner. For example, a processor may be caused by software to present a user interface for a user to select and input an assigned value. The assigned value may be received, and then be stored in a database associated with the media element, or may be recorded immediately, or at a later time, as metadata associated with a digital media element. In another embodiment, automated processes, including, for example, pattern recognition software, may assign values on one or more scales.

It will be appreciated that, for example, scenes from a dramatic film may be tagged with a wide variety of binary tags. Tags for the presence and absence of men, women, vehicles, cars, trains, actions, such as persons entering buildings, persons leaving buildings, demographic characteristics, and other characteristics. Entirely different selected parameters may return the same scene.

In an embodiment, pre-existing programming, such as films, may be tagged as individual media elements, and then the media elements assembled into programming using entirely different criteria. The pre-existing programming may be divided into fixed media elements, or the tagging of media elements may be accomplished by designating time periods associated with the programming to have various tags associated therewith.

Figure 7:
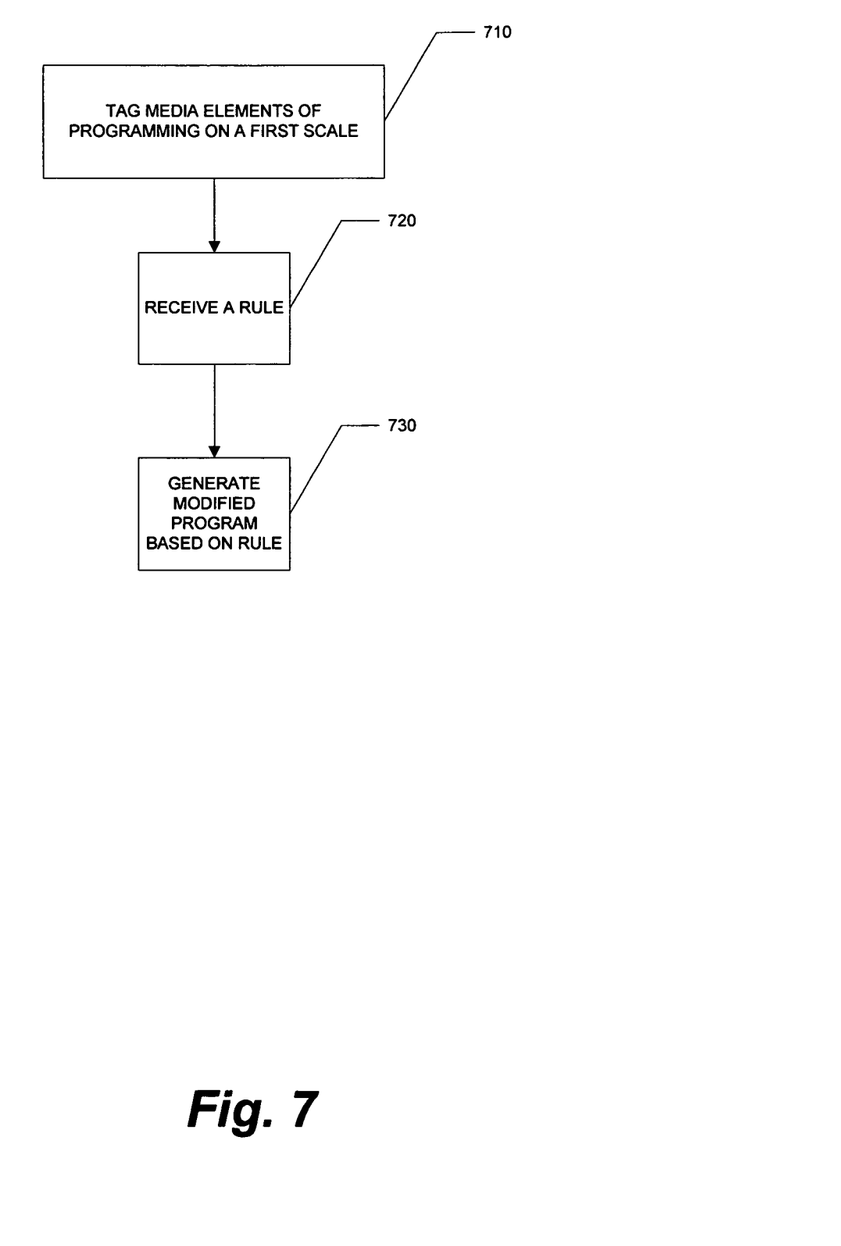
FIG. 7 is a process flow diagram of a process according to an embodiment.

In another embodiment, explained with reference to FIG. 7, pre-existing programming may be tagged as individual media elements according to one or more selected parameters, as indicated at 710. The media elements may be tagged in this embodiment with a temporal order consistent with the pre-existing programming. By way of example, the parameters may be sex and violence. A user may be given the option of selecting a level, such as a maximum level, of one of these parameters, such as sex and violence. Upon receiving a selection, indicated at 720, a system may generate programming, in the form of a version of the preexisting programming having media elements that exceeded a selected level of sex or violence excluded from the assembled programming, as indicated at 730. In another embodiment, a user may select a desired level, or a minimum level of a parameter such as sex, violence, or other material, and a version of the programming may be generated meeting those requirements. In these embodiments, the temporal order of the media elements as presented in the pre-existing programming may be preserved.

Figure 8:
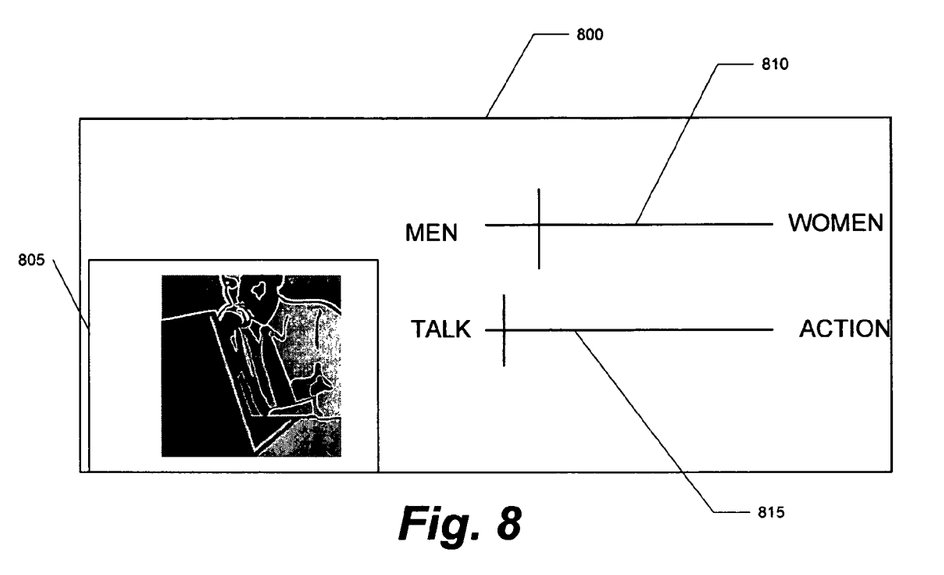
FIG. 8 illustrates a display according to an embodiment.

Referring now to FIG. 8, a further method of generating programming from media elements will be described. A user has presented to him or her at least a first media program, shown in the window 805 of display 800. The program may have one or more parameters associated therewith, or individual media elements included in the program may have one or more parameters associated therewith. The parameters may relate to the subject matter of the program, the nature of the program, or other factors. By way of example, parameters related to the depicted frame may relate to the proportion of men and women depicted in the programming, and to the level of action versus talk. In the disclosed embodiment, two sliders 810, 815 are indicated for these two parameters. If the user adjusts either of these sliders, such as by moving a mouse cursor over a slider, clicking, and dragging to the left or right, a signal is provided to the system to adjust the parameters related to generation of programming. The system then proceeds to assemble and return at least a second media program responsive to the user parameter selection.

The user prompt may take any suitable form. Examples of forms include buttons, arrows, selectable boxes, numerical values, and any other type of form available.

The parameters may take a wide variety of forms. For example, if the current media programming relates to a musical artist or band, the parameters may include bands influenced by the band currently displayed, more emphasis or individual members, different styles of music, by way of example. If the programming relates to an individual, such as an actor/director, the parameters presented may include such choices as leading role, cameo appearance, early career, recent appearances, and other information.

The parameters may include a wide variety of factors that can be adjusted. For example, the setting of scenes may be adjusted between such extremes as city and wilderness, summer and winter, wealthy environment and poor environment, and the like. A conversation parameter may be provided between such extremes as intellectual versus simple and friendly versus hostile. Scales such as those established in connection with a method illustrated above with respect to FIG. 6 may be employed.

It will be appreciated that the ability to select parameters depends on the tagging associated with the media elements.

Figure 9:
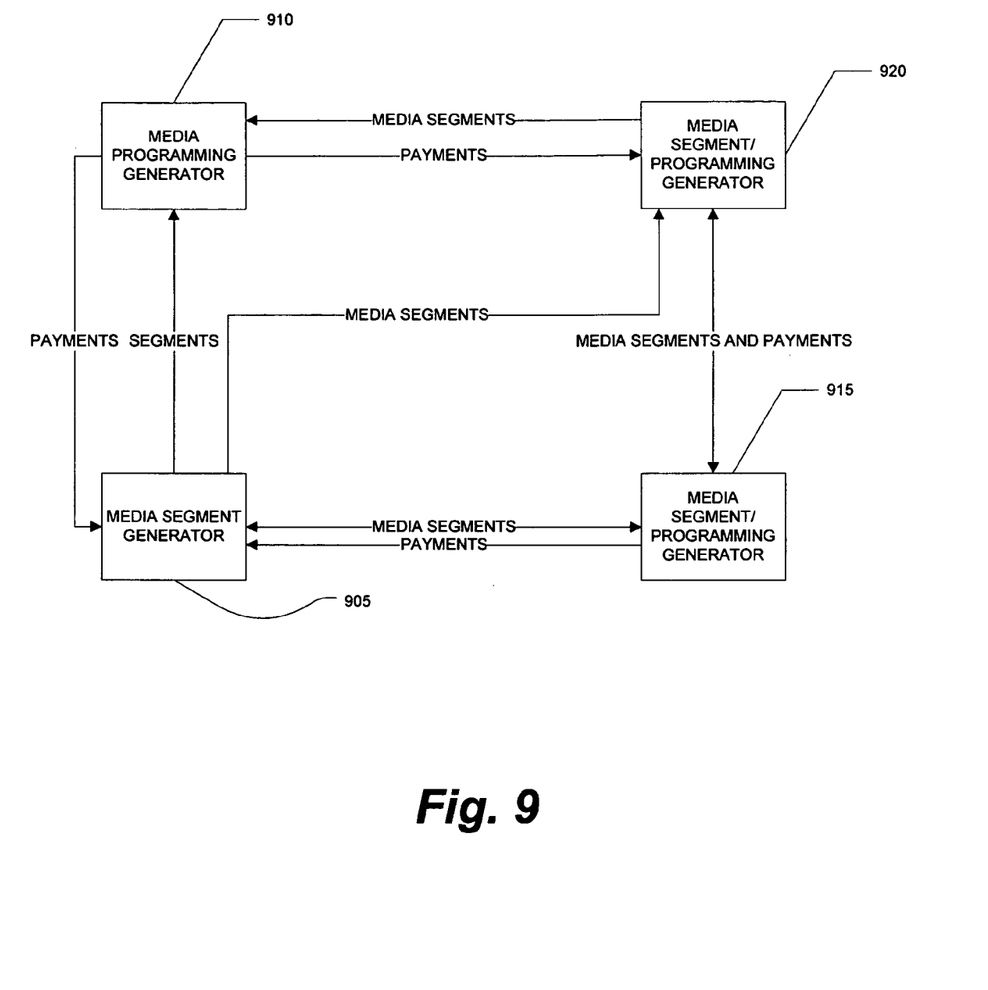
FIG. 9 is a block diagram illustrating an embodiment.

Referring now to FIG. 9, a method for generation of media from media elements having associated rules related to sharing of the elements will be described. In the embodiment of FIG. 9, media segment generators 905, media programming generators 910, and combined media segment and media programming generators 915, 920 are shown. Media segment generators 905 provide segments that may be employed in the generation of programming. Media programming generators 910 generate programming employing media segments provided by others. Combined media segment and media programming generators 920 both generate media segments and generate media programming from generated segments.

Media segment generators 905 may associate rules related to use of media segments that they generate. The rules may be in the form of tags that are associated with the media segments. The media segments may then be provided to media programming generators 910, and to combined media segment and media programming generators 915, 920. The rules may, by way of example, permit use in exchange for specified consideration, such as a cash payment, based on a suitable formula. The rules may provide for payment by the media programming generator for use, such as for advertisements of a product or service. It will be appreciated that the programming generator may maintain a log of such uses, and periodically provide statements.

The rules contained in the tag may also include restrictions on use. By way of example, the tag may include restrictions on use together with or adjacent to a particular type of media element or programming. By way of example, a rule may provide that the media element may not be used immediately adjacent to an advertisement, or not within a certain period of time before an advertisement, or after an advertisement. By way of further example, a rule may specify that a media element is not to be used within a given interval after a media element having a particular type of music. For example, a media element including polka music may indicate that it is not to be used within an interval of a certain period of time of any media element including rock music. By way of further example, a media element advertising vehicles with a stress on safety may contain instructions that it is for use within a certain period of time after any programming involving vehicle accidents. Alternatively, consideration for insertion of the advertisement may be greater if the use is within a certain period of time following programming on a selected topic. By way of further example, the tag may include restrictions on use to users who are identified as having certain preferences, or as belonging to a particular demographic. For example, a tag may identify that the media element is for use exclusively for females in the 20 to 29 year age range. By way of further example, a media element may include rules indicating that it is not to be used within a certain interval of any media element having a certain mood. For example, a media element showing a party scene may have a rule indicating that it is not for use within five minutes of a media element tagged as having a mood indicated as sad, somber or mourning.

The methods and systems described above may be implemented with computer storage products or computer readable media that contain program code or computer software for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

It will be appreciated that any of the steps in the methods described above may be implemented by one or more processors executing instructions stored in computer-readable memories. It will be appreciated that any of the method steps described above may be implemented by means for performing the step, wherein the means for performing the step include a processor operating in accordance with instructions contained in computer program code.

The methods and systems described herein may employ any suitable communications interface and hardware. By way of non-limiting example, communications may be implemented in a network, such as the Internet, employing the TCP/IP protocol.

Media elements may be stored in any suitable medium, which may include magnetic media, and both digital and analog media. Media elements may be stored and transmitted in a compressed format, such as the MPEG-3 format for video, or may be stored and transmitted in uncompressed formats. Tags may be included in fields in files containing media elements in digital format, and may be deemed metadata. Alternatively, media elements may include one or more identifying indicia, and tag information may be stored in separate databases or other files.

In embodiments having multiple media generators, it will be appreciated that there are numerous possible distributions of the functions of generating media. For example, all media elements may be stored in a single media source, which generates all programming. Alternatively, an entire library of media elements, or portions of a library of media elements, may be stored in association with one or more additional media generators. Protocols may be provided for distribution of media elements between different stored libraries of media elements. A library of media elements is any set of more than one media element.

It will be appreciated that the embodiments described and illustrated herein are merely exemplary.

What is claimed is:

1. A method of generating media programming from media elements, comprising the steps of:
    providing a first media source and a second media source that is different from the first media source, each media source having, respectively, a plurality of first and second media elements, wherein
    each said media element is associated with a plurality of tags,
    at least one tag is temporal and associates at least some of said media elements with pre-existing programming having a temporal order, regardless of any inherent temporal order of said media elements,
    at least one of said tags is an identifier that associates at least some of said media elements with said second media source,
    at least one of said tags is scaled and assigns a value on a first scale to at least some of said media elements,
    at least one of said tags is scaled and assigns a value on a second scale to at least some of said media elements,
    the first media source is associated with at least one template that comprises at least one rule for assembling said media elements into media programming based on one or more of said tags,
    the second media source is associated with at least one template that is user-independent and comprises at least one rule for assembling said media elements into media programming based on one or more of said tags;
    receiving a request for media programming at said second media source from a user via a network;
    in response to receiving said request for media programming, applying at least one rule of one template to at least one tag that is a scaled tag, applying at least one rule of one template to one tag that is a temporal tag, and selecting a set of media elements according to said applied rules;
    generating initial media programming comprising selected ones of said set of media elements that are associated with said second media source by said identifier tag and which are assembled according to at least one user-independent second template;
    generating subsequent media programming comprising selected ones of said set of media elements that are different from those selected initially, and which are assembled according to at least one rule of one template wherein a temporal order consistent with said pre-existing programming is preserved; and
    delivering the generated initial and subsequent media programming to the user via the network.

2. The method of claim 1, wherein said step of generating media programming is performed at the first media source.

3. The method of claim 1, wherein said step of generating media programming is performed at the second media source.

4. The method of claim 1, wherein said second template requires insertion in the generated programming of a media element identifying an owner or operator of the second media source.

5. The method of claim 1, wherein said second template determines a topic of the generated programming.

6. A method according to claim 1, further comprising the steps of:
    receiving at least one media element from said first or second media source, said media element having at least one tag associated with a template rule relating to demographic characteristics of a user for whom the media element may be used and at least one tag associated with a template rule relating to payment for use of the media element; and
    applying at least one said demographic or payment rule to generating at least one of said initial and subsequent media programming.

7. The method of claim 6, further comprising at least one rule relating to tags associated with types of media elements that are permitted to be assembled adjacent to each other.

* * * * *